(12) United States Patent
Ouchi et al.

(10) Patent No.: US 10,666,826 B2
(45) Date of Patent: *May 26, 2020

(54) READING MODULE HAVING REFLECTION MIRROR ARRAY, IMAGE READING DEVICE COMPRISING SAME, AND IMAGE FORMING APPARATUS THEREWITH

(71) Applicant: KYOCERA Document Solutions Inc., Osaka (JP)

(72) Inventors: Kei Ouchi, Osaka (JP); Takaaki Murase, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/333,123

(22) PCT Filed: Sep. 1, 2017

(86) PCT No.: PCT/JP2017/031511
§ 371 (c)(1),
(2) Date: Mar. 13, 2019

(87) PCT Pub. No.: WO2018/100820
PCT Pub. Date: Jun. 7, 2018

(65) Prior Publication Data
US 2019/0230241 A1    Jul. 25, 2019

(30) Foreign Application Priority Data
Nov. 30, 2016   (JP) ................................. 2016-232316

(51) Int. Cl.
*H04N 1/00* (2006.01)
*H04N 1/03* (2006.01)
(Continued)

(52) U.S. Cl.
CPC ............. *H04N 1/0305* (2013.01); *G02B 5/10* (2013.01); *G02B 13/24* (2013.01); *G02B 17/08* (2013.01);
(Continued)

(58) Field of Classification Search
CPC .. H04N 1/0305; H04N 1/1056; H04N 1/1937; H04N 1/19; H04N 1/028;
(Continued)

(56) References Cited

U.S. PATENT DOCUMENTS 8,345,325 B2    1/2013   Schmidt et al. ............. 358/475
10,228,557 B2*  3/2019   Ouchi ................. H04N 1/1937
(Continued)

FOREIGN PATENT DOCUMENTS

CN          1636157 A      7/2005
CN        103179312 A      6/2013
(Continued)

OTHER PUBLICATIONS

Chinese Office Action dated Sep. 4, 2019, issued by the National Intellectual Property Administration in corresponding application CN 201780057875.7.

*Primary Examiner* — Juan M Guillermety
(74) *Attorney, Agent, or Firm* — Stein IP, LLC

(57) ABSTRACT

A reading module has a light source, an optical system having a mirror array and an aperture stop portion, a sensor in which a plurality of image regions where the image light is converted into an electrical signal are arranged; a housing; and a light-shielding wall shielding stray light striking the image regions. In the mirror array, a plurality of reflective mirrors whose reflection surfaces are aspherical concave surfaces are coupled together in an array in the main scanning direction. The optical system is fixed to on the case housing at one point in the main scanning direction, and the (Continued)

light shielding walls are arranged at a positions displaced deviated by a predetermined amount from boundaries between the image regions in the direction opposite to the fixed side of the optical system.

8 Claims, 5 Drawing Sheets

(51) Int. Cl.
| | | |
|---|---|---|
| *G02B 13/24* | (2006.01) | |
| *H04N 1/193* | (2006.01) | |
| *H04N 1/10* | (2006.01) | |
| *G02B 17/08* | (2006.01) | |
| *G02B 5/10* | (2006.01) | |
| *H04N 1/19* | (2006.01) | |
| *H04N 1/028* | (2006.01) | |
| *G06T 1/00* | (2006.01) | |
| *G03B 27/54* | (2006.01) | |

(52) U.S. Cl.
CPC ............... *G03B 27/54* (2013.01); *G06T 1/00* (2013.01); *H04N 1/028* (2013.01); *H04N 1/1056* (2013.01); *H04N 1/19* (2013.01); *H04N 1/1937* (2013.01)

(58) Field of Classification Search
CPC .......... G02B 13/24; G02B 5/10; G02B 17/08; G06T 1/00; G03B 27/54
See application file for complete search history.

(56) References Cited

U.S. PATENT DOCUMENTS

| | | | | |
|---|---|---|---|---|
| 10,237,437 | B2* | 3/2019 | Murase | H04N 1/0301 |
| 2003/0095335 | A1 | 5/2003 | Ogi | 359/652 |
| 2005/0012973 | A1 | 1/2005 | Sowa et al. | 359/198 |
| 2008/0030570 | A1* | 2/2008 | Nomura | B41J 2/45 |
| | | | | 347/238 |
| 2009/0009867 | A1 | 1/2009 | Sowa et al. | 359/507 |
| 2009/0316225 | A1* | 12/2009 | Fujioka | H04N 1/0284 |
| | | | | 358/474 |
| 2010/0284045 | A1* | 11/2010 | Kawano | H04N 1/1935 |
| | | | | 358/474 |
| 2013/0083414 | A1 | 4/2013 | Schmidt et al. | 359/858 |
| 2013/0155472 | A1 | 6/2013 | Kawano et al. | 358/450 |
| 2014/0111835 | A1* | 4/2014 | Ozawa | H04N 1/028 |
| | | | | 358/475 |
| 2018/0035001 | A1* | 2/2018 | Murase | H04N 1/1937 |
| 2018/0149861 | A1* | 5/2018 | Ouchi | H04N 1/1937 |
| 2018/0152580 | A1* | 5/2018 | Murase | H04N 1/02885 |

FOREIGN PATENT DOCUMENTS

| | | |
|---|---|---|
| JP | 2003-121608 A | 4/2003 |
| JP | 2012-54910 A | 3/2012 |
| JP | 2014-42147 A | 3/2014 |
| JP | 2015-118357 A | 6/2015 |
| WO | WO 2015/072284 A1 | 5/2015 |

* cited by examiner

READING MODULE HAVING REFLECTION MIRROR ARRAY, IMAGE READING DEVICE COMPRISING SAME, AND IMAGE FORMING APPARATUS THEREWITH

CROSS-REFERENCE TO RELATED APPLICATIONS

This application is a national stage of International Application No. PCT/JP2017/031511 filed Sep. 1, 2017, which claims the benefit of priority to Japanese Application No. 2016-232316, filed Nov. 30, 2016, in the Japanese Patent Office, the disclosures of which are incorporated herein by reference.

TECHNICAL FIELD

This invention relates to a reading module which is used in digital multifunction peripherals, image scanners, and the like and which reads image light reflected from a document irradiated with light, and to an image reading device and an image forming apparatus incorporating such a reading module.

BACKGROUND ART

Conventional optical imaging systems for image reading devices incorporated in multifunctional peripherals and the like using an electro-photographic process include a reduction optical system that images an image while reducing it and a unity magnification optical system that images an image at unity magnification without reducing it.

In a reduction optical system, a reduced image is imaged on an image sensor whose size is smaller than the size of a document (for example, one-fifth to one-ninth the size of a document) by use of a plurality of flat mirrors and optical lenses, and then the image is read. In the reduction optical system, as an image sensor, a charge-coupled device, which is called a CCD (charge-coupled device) sensor, is used. The reduction optical system has the advantage of a deep depth of field. Here, the depth of field is a range in which, even when a subject (here a document) is deviated from the in-focus position along the optical axis, the subject appears to be in focus. This means that, with a deep depth of field, even when the document is deviated from a prescribed position, it is possible to obtain a satisfactory image.

On the other hand, the reduction optical system has the disadvantage of a very large optical path length (a distance over which light travels from the subject to the sensor) of 200 to 500 mm. In image reading devices, for the purpose of securing the optical path length in a limited space in a carriage, a plurality of flat mirrors are used to change the direction in which light travels. This undesirably leads to an increased number of components and thus to increased cost. In a case where a lens is used in the optical system, chromatic aberration occurs due to refractive index varying with wavelength. To correct the chromatic aberration, a plurality of lenses are required. Using a plurality of lenses in this way also results in increased cost.

In a unity magnification optical system, as disclosed in Patent Document 1, with a plurality of erect-image unity-magnification rod lenses arranged in an array, an image is imaged on an image sensor whose size is equal to the size of a document, and the image is read. In the unity magnification optical system, as an image sensor, a photoelectric conversion device, which is called CMOS (complementary MOS) sensor, is used. The unity magnification optical system has the advantage of, compared with the reduction optical system, a smaller optical path length of 10 to 20 mm and a smaller size. Imaging is performed by use of rod lenses alone and thus no mirrors as are needed in the reduction optical system are required. It is thus possible to reduce the thickness of a scanner unit incorporating a unity magnification optical system sensor, and thereby achieve a simple structure and hence reduced cost. On the other hand, the unity magnification optical system has a very small depth of field; thus, when a document is deviated from a prescribed position along the optical axis, differences in magnification among the individual lenses causes image blur that appears as greatly softened focus. This results in the disadvantage of inability to uniformly read a book document or a document with an uneven surface.

In recent years, other than the reduction optical system and the unity magnification optical system described above, as disclosed in Patent Document 2, a method has been proposed in which an image is read by use of a reflection mirror array in an imaging optical system. In this method, with a plurality of reflection mirrors arranged in an array, a document read in different reading regions corresponding to the reflection mirrors is imaged into a reduced inverted image on a sensor. Unlike the unity magnification optical system using a rod-lends array, one region is read and imaged with one optical system. By adopting a telecentric optical system as the imaging system, when a document is read on a region-to-region basis, no image blur occurs due to overlap among images at different magnifications; it is thus possible to suppress softened focus and achieve a multi-mirror reading method.

Moreover, in this method, the optical system uses mirrors alone, and thus unlike in a case where the optical system uses a lens, no chromatic aberration occurs. Accordingly, there is no need for correcting chromatic aberration, and thus the number of elements constituting the optical system can be reduced.

LIST OF CITATIONS

Patent Literature

Patent Document 1: JP-A-2003-121608
Patent Document 2: U.S. Pat. No. 8,345,325

SUMMARY OF THE INVENTION

Technical Problem

Inconveniently, in a case where, as disclosed in Patent Document 2, the optical system is composed of a mirror array where reflection mirrors are arranged continuously in the main scanning direction, light with which the document is irradiated by a light system is scattered and is then diffused in the different directions; thus, the light reflected from the neighboring reflection mirror passes through an aperture stop and, as flare light (stray light), reaches the sensor. The amount of light incident as the flare light changes with the reflectance of a document which is the reading target and thus can not be corrected. Thus, a configuration is necessary in which the flare light does not enter the sensor.

In view of the above-mentioned problem, an object of the present invention is, in a reading method using a mirror array having reflection mirrors arranged in an array, to provide a reading module which can prevent incidence of flare light reflected from neighboring reflection mirrors and to provide an image reading device and an image forming apparatus incorporating such a reading module.

Means for Solving the Problem

To achieve the above object, according to a first configuration of this invention, a reading module includes a light source, an optical system, a sensor, a housing, and a light shielding wall. The light source irradiates a document with light. The optical system images, as image light, reflected light of the light with which the document is irradiated by the light source. In the sensor, a plurality of image regions where the image light imaged by the optical system is converted into an electrical signal are arranged next to each other in the main scanning direction. The housing houses the light source, the optical system, and the sensor. The light shielding walls extend from the sensor toward an aperture stop portion and shield stray light striking the image regions. The optical system includes a mirror array and the aperture stop portion and is fixed on the housing at one point in the main scanning direction. In the mirror array, a plurality of reflection mirrors whose reflection surfaces are aspherical concave surfaces are coupled together in an array in the main scanning direction. The aperture stop portions are provided respectively between the reflection mirrors and the image regions, and adjust the amount of image light reflected from the reflection mirrors. An imaging magnification of the reflection mirrors with respect to the image regions is set at a reduction magnification. The light shielding walls are arranged at positions deviated by a predetermined amount from the boundaries between the image regions in the direction opposite to a fixed side of the optical system.

Advantageous Effects of the Invention

According to the first configuration of this invention, with consideration given to expansion of the optical system due to increase in ambient temperature, the light shielding walls are previously arranged at positions deviated by a predetermined amount in the direction opposite to the fixed side of the optical system so that, even when an imaging position on the sensor is moved by expansion of the optical system, the desired rays of light are not shielded by the light shielding wall. Accordingly, there is no need to reduce the reduction magnification of the reflection mirrors and thus it is possible to perform high-resolution reading.

BRIEF DESCRIPTION OF DRAWINGS

FIG. 6 is a partly enlarged view showing the optical path between the reflection mirror 35a and the image region 41a on the sensor 41, showing the structure where light shielding walls 43 are provided at the boundaries between the image regions 41a;

DESCRIPTION OF EMBODIMENTS

Figure 1:
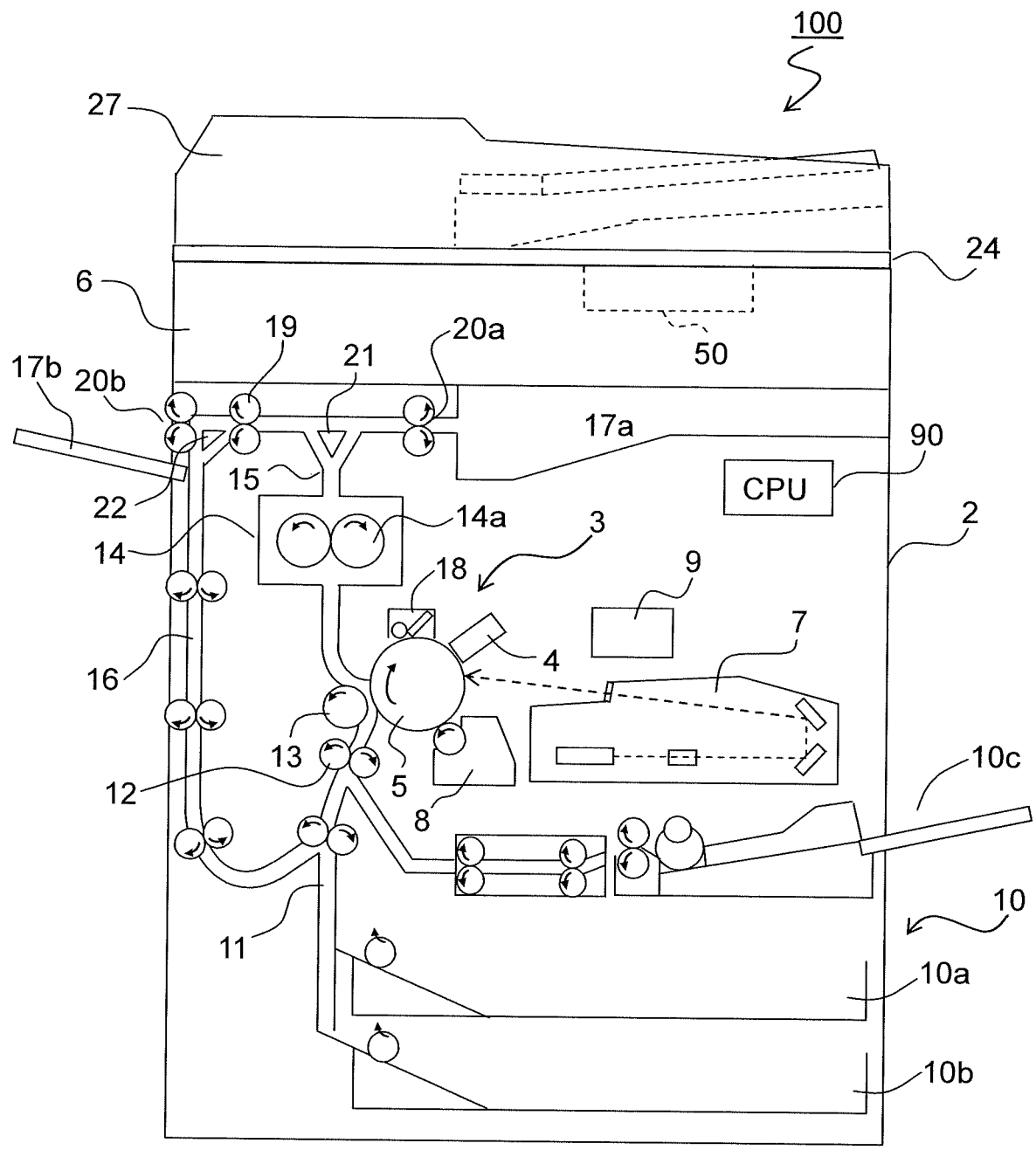
FIG. 1 is a side sectional view showing the overall configuration of an image forming apparatus 100 incorporating an image reading portion 6 using a reading module 50 according to the present invention.

Hereinafter, with reference to the accompanying drawings, embodiments of the present invention will be described. FIG. 1 is a diagram showing an outline of the configuration of an image forming apparatus 100 incorporating an image reading portion 6 using a reading module 50 according to the present invention. In the image forming apparatus 100 shown in FIG. 1 (here, a digital multifunction peripheral is taken as an example), copy operation proceeds as follows. In the image reading portion 6, which will be described later, document image data is read and is converted into an image signal. On the other hand, in an image forming portion 3 inside a multifunction peripheral main body 2, a photosensitive drum 5 rotating in the clockwise direction in FIG. 1 is electrically charged uniformly by a charging unit 4. Then, an electrostatic latent image based on the document image data read in the image reading portion 6 is formed on the photosensitive drum 5 by a laser beam from an exposure unit (such as a laser scanning unit) 7. Developer (hereinafter, referred as toner) is attached to the formed electrostatic latent image by a developing unit 8, and thereby a toner image is formed. Toner is fed to the developing unit 8 from a toner container 9.

Toward the photosensitive drum 5 having the toner image formed on it as described above, a sheet is conveyed from a sheet feeding mechanism 10 via a sheet conveying passage 11 and a registration roller pair 12 to the image forming portion 3. The sheet feeding mechanism 10 includes sheet feeding cassettes 10a and 10b, and a stack bypass (manual feed tray) 10c arranged over the sheet feeding cassettes 10a and 10b. When the conveyed sheet passes through a nip portion between the photosensitive drum 5 and a transfer roller (image transfer portion) 13, toner image on the surface of the photosensitive drum 5 is transferred to the sheet. Then, the sheet having the toner image transferred to it is separated from the photosensitive drum 5, and is conveyed to a fixing portion 14 including a fixing roller pair 14a, so that the toner image is fixed there. The sheet having passed through the fixing portion 14 is distributed between different conveying directions by passage switching mechanisms 21 and 22 arranged at branch points in the sheet conveying passage 15. The sheet is then, as it is (or after being transported to a reverse conveying passage 16 and being subjected to double-sided copying), discharged onto a sheet discharge portion composed of a first discharge tray 17a and a second discharge tray 17b.

Toner remaining on the surface of the photosensitive drum 5 after the toner image has been transferred is removed by a cleaning device 18. Electric charge remaining on the surface of the photosensitive drum 5 is removed by a static eliminator (unillustrated) arranged on the downstream side of the cleaning device 18 in the rotation direction of the photosensitive drum 5.

In an upper part of the multifunction peripheral main body 2, the image reading portion 6 is arranged. A platen (document presser) 24 presses and thereby holds a document placed on a contact glass 25 (see FIG. 2) fixed on the top face of the image reading portion 6. The platen 24 is provided so as to be openable and closable. On the platen 24, a document conveying device 27 is fitted.

Inside the multifunction peripheral main body 2, there is further arranged a control portion (CPU) 90 that controls the operation of the image forming portion 3, the image reading portion 6, the document conveying device 27, and the like.

Figure 2:
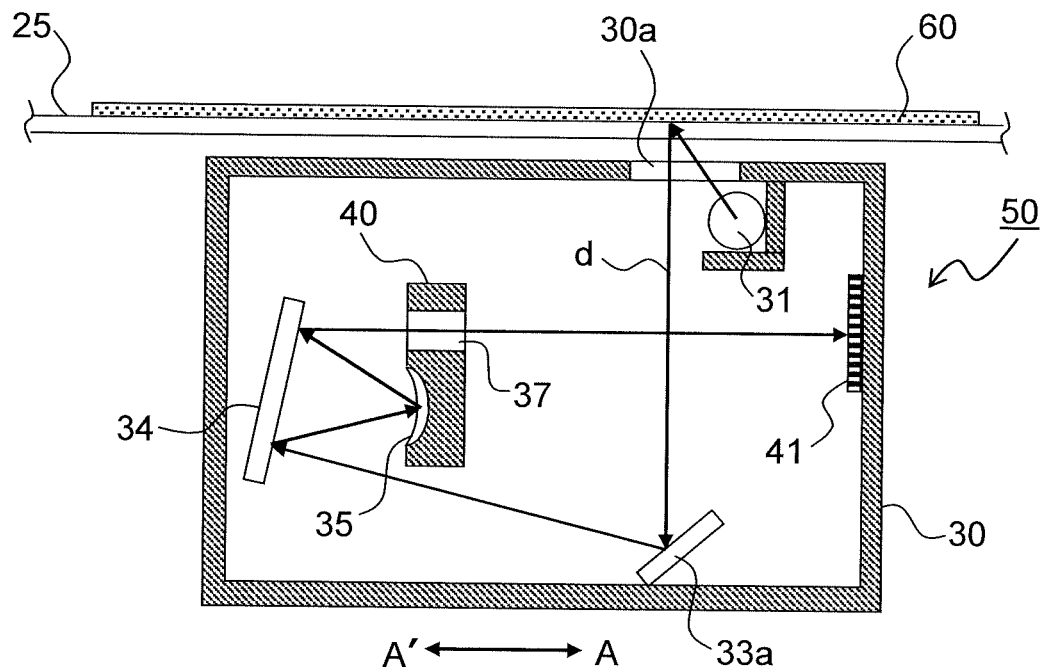
FIG. 2 is a side sectional view showing the internal structure of the reading module 50, according to one embodiment of the present invention, that is incorporated in the image reading portion 6.
Figure 3:
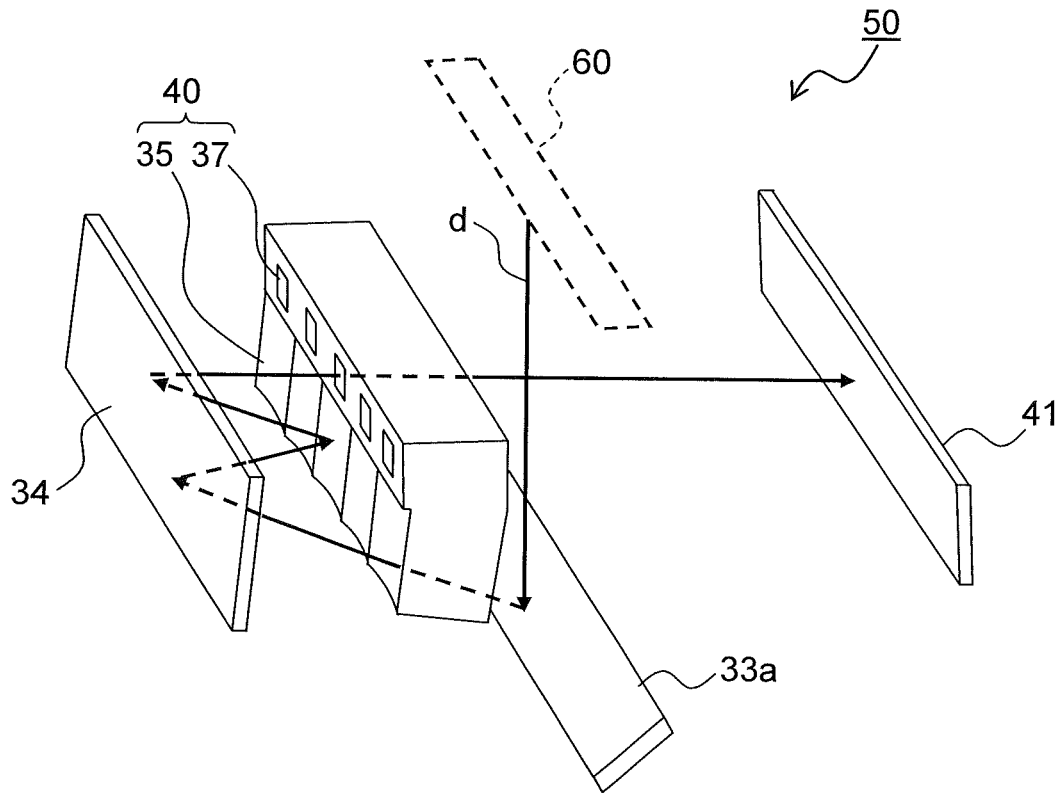
FIG. 3 is a partial perspective view showing the internal structure of the reading module 50 according to this embodiment.
Figure 4:
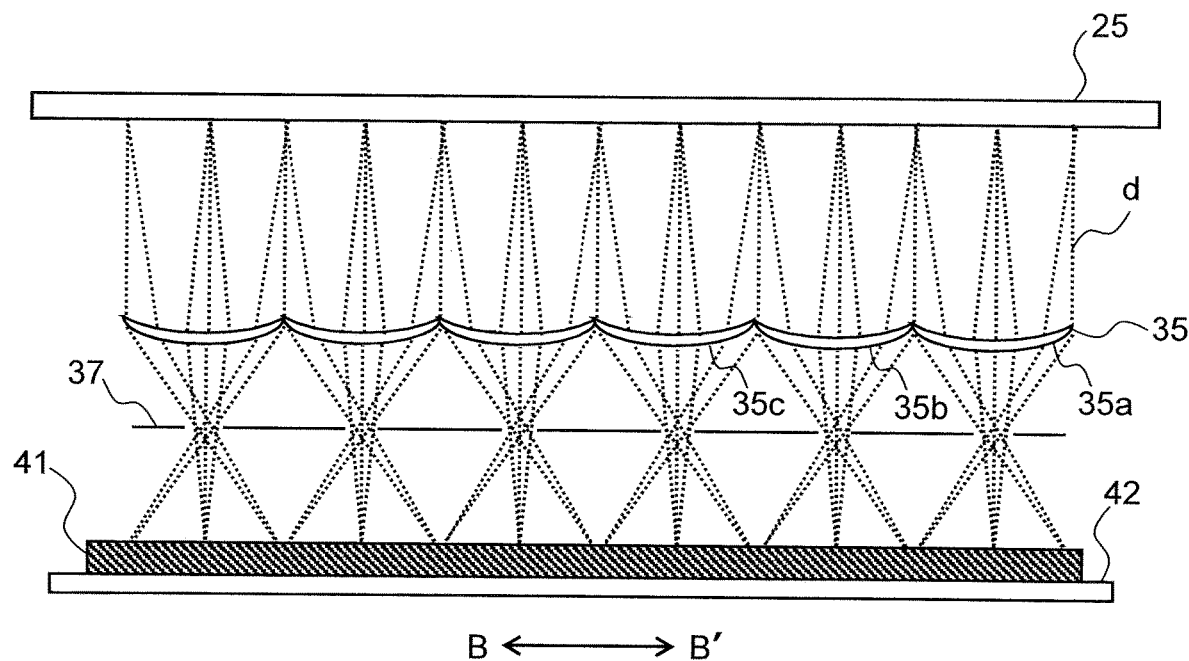
FIG. 4 is a sectional plan view showing the structure between an optical unit 40 and a sensor 41 in the reading module 50 according to this embodiment in a model where rays of light are transmitted.

FIG. 2 is a side sectional view showing the internal structure of a reading module 50, according to one embodiment of the present invention, that is incorporated in the image reading portion 6. FIG. 3 is a perspective view showing, in the reading module 50 according to this embodiment, the optical path from a document 60 to a sensor 41. FIG. 4 is a sectional plan view showing the structure between an optical unit 40 and the sensor 41 in the reading module 50 according to this embodiment. Although, in FIG. 4, a mirror array 35 provided in the optical unit 40 reflects rays of light, for the sake of convenience of description, FIG. 4 shows a model where the optical unit 40 transmits rays of light.

The reading module 50 is arranged under the contact glass 25 so as to be reciprocatable in the sub-scanning direction (the direction indicated by arrows A and A'). The reading module 50, while moving, reads an image on the obverse side (lower side in FIG. 2) of the document 60 placed on the contact glass 25. The reading module 50 also reads, while remaining at rest right under the automatic reading position of the contact glass 25, an image on the obverse side of the document 60 conveyed by the document conveying device 27 (see FIG. 1).

As shown in FIG. 2, in a housing 30 of the reading module 50, there are provided a light source 31, a flat mirror 33*a*, a turning mirror 34, a mirror array 35 composed of a plurality of reflection mirrors of which the reflection surfaces are aspherical surfaces, an aperture stop portion 37, and a sensor 41 as a reading means. The sensor 41 is supported on a sensor base 42 (see FIG. 4). As the sensor 41, a CCD or CMOS image sensor is used according to the design. The reading module 50 has a home position right under a shading plate (unillustrated) for acquiring white reference data.

In the above-described configuration, when a document image is read in a fixed-document manner, image reading proceeds as follows. First, the document 60 is placed on the contact glass 25 with the image side down. Then, while the image side of the document 60 is irradiated with light emitted from the light source 31 and having passed through an opening 30*a*, the reading module 50 is moved from the scanner home side to the scanner return side at a predetermined speed. As a result, the light reflected from the image side of the document 60, that is, image light d (indicated by the solid-line arrows), has its optical path changed by the flat mirror 33*a*, and is then reflected from the turning mirror 34. The reflected image light d is converged by the mirror array 35 and is reflected again from the turning mirror 34; then, the reflected image light d passes through the aperture stop portion 37 and is imaged on the sensor 41. The imaged image light d is, in the sensor 41, divided into pixels and converted into electrical signals commensurate with the concentration at respective pixels. In this way, image reading is achieved.

On the other hand, when a document image is read in a sheet-through manner, image reading proceeds as follows. The reading module 50 is moved to right under an image reading region (image reading position) on the contact glass 25. Then, the image side of a document which is sequentially conveyed while being slightly pressed against the image reading region by the document conveying device 27 is irradiated with light from the light source 31. Then, the image light reflected from the image side is imaged on the sensor 41 via the flat mirror 33*a*, the turning mirror 34, the mirror array 35, the turning mirror 34, and the aperture stop portion 37. In this way, image reading is achieved.

As shown in FIG. 3, the mirror array 35 and the aperture stop portion 37 are formed integrally of the same material and are integrated into a unit as the optical unit 40. Forming integrally the mirror array 35 and the aperture stop portion 37 makes it possible to keep the positions of the mirror array 35 and the aperture stop portion 37 relative to each other with high accuracy. Thus, it is possible to effectively prevent imaging performance from deteriorating resulting from the positions of the mirror array 35 and the aperture stop portion 37 relative to each other changing because of expansion or contraction due to change in temperature.

The turning mirror 34 is arranged at a position facing the mirror array 35. The turning mirror 34 reflects both the rays of light (image light d) which travel from the document 60 via the flat mirror 33*a* to strike the mirror array 35 and the rays of light (image light d) which are reflected from the mirror array 35 to enter the aperture stop portion 37.

As shown in FIG. 4, the mirror array 35 imaging the image light d on the sensor 41 is configured such that a plurality of reflection mirrors 35*a*, 35*b*, 35*c* . . . corresponding to predetermined regions on the sensor 41 are coupled together in an array in the main scanning direction (the direction indicated by arrows B and B').

With the configuration according to this embodiment, the image light d reflected from reading regions Ra, Rb (see in FIG. 5) . . . on the document 60 divided in the main scanning direction has its optical path changed by the flat mirror 33*a* and the turning mirror 34 (see in FIG. 2), and strikes to the reflection mirrors 35*a*, 35*b*, 35*c* . . . of the mirror array 35. The image light d is reduced to a predetermined reduction magnification by the reflection mirrors 35*a*, 35*b*, 35*c* . . . and is reflected again from the turning mirror 34; then, the image light d passes through the aperture stop portion 37 and is imaged as an inverted image in corresponding image regions 41*a*, 41*b* . . . on the sensor 41.

The inverted images imaged in the image regions 41*a*, 41*b* . . . are converted into digital signals. Data interpolation is performed in the respective image regions 41*a*, 41*b* . . . according to the reduction magnification, and thereby magnification enlargement correction is performed. The data is inverted into an erect image, and then images in the respective image regions 41*a*, 41*b* . . . are connected together to form an output image.

The aperture stop portion 37 is arranged at the focuses of the reflection mirrors 35*a*, 35*b*, 35*c* . . . constituting the mirror array 35, and thus the physical interval (the distance in the up-down direction in FIG. 2) between the aperture stop portion 37 and the mirror array 35 is determined according to the reduction magnification of the mirror array 35. The reading module 50 according to this embodiment is configured such that the turning mirror 34 reflects rays of light twice; this makes it possible to secure the desired optical path length from the mirror array 35 to the aperture stop portion 37, and thus to minimize the angles of incidence and reflection of the image light d with respect to the mirror array 35. It is thus possible to prevent the images imaged in the image regions 41*a*, 41*b* . . . from curving.

When the turning mirror 34 is divided into a plurality of mirrors, light reflected on edge parts of the mirrors, as stray light, strikes the mirror array 35 or enters the aperture stop portion 37. Using a flat mirror as the turning mirror 34, as in this embodiment, makes it possible to prevent the effect of stray light even when two beams of light overlap each other on the turning mirror 34. Although, in this embodiment, the flat mirror 33a is used to reduce the size of the reading module 50 in its height direction, a configuration that does not use a flat mirror 33a is also possible.

In a multi-mirror reading method using the mirror array 35 as in this embodiment, if the imaging magnification varies with the position on a document (the optical path length between a reflection mirror and a document) among the regions corresponding to the reflection mirrors 35a, 35b, 35c . . . , when part of a document 60 floats off the contact glass 25, images overlap or split at positions next to the boundaries between the reflection mirrors 35a, 35b, 35c . . . , so that a defective image is produced.

In this embodiment, the document 60 and the mirror array 35 are so arranged as to constitute a telecentric optical system between them. The telecentric optical system has the feature that the principal ray of the image light d passing through the center of the aperture stop portion 37 is perpendicular to the surface of the document. Thus, the imaging magnification of the reflection mirrors 35a, 35b, 35c . . . does not vary with the position on the document; it is thus possible to obtain a reading module 50 that, even when reading the document 60 in a form divided into small regions, causes no image bleeding and provides a deep depth of field. One reservation is that, since the principal ray then needs to be perpendicular to the surface of the document irrespective of the document position, it is necessary to use a mirror array 35 of which the size in the main scanning direction is comparable with or larger than the size of the document.

In the multi-mirror reading method using the mirror array 35 described above, when the image light d reflected from the reflection mirrors 35a, 35b, 35c . . . and having passed through the aperture stop portion 37 is imaged in a predetermined region on the sensor 41, the image light d outside the reading region may strike, as stray light, a region next to the predetermined region on the sensor 41.

Figure 5:
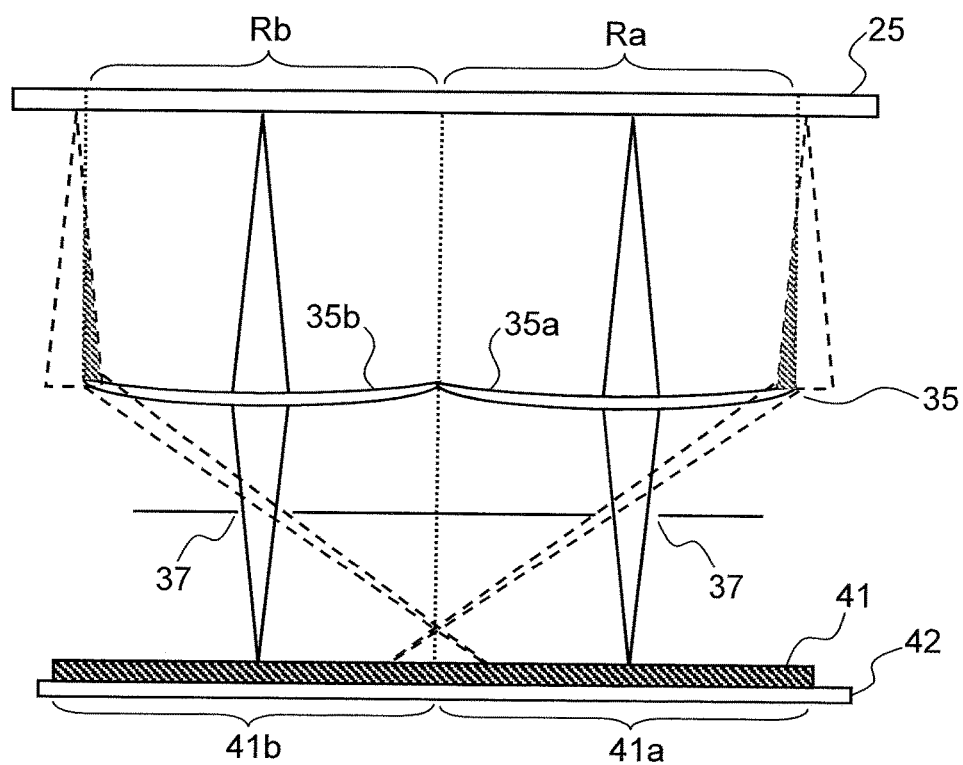
FIG. 5 is a partly enlarged view showing the optical path between the reflection mirrors 35a and 35b and the sensor 41 in FIG. 4.

FIG. 5 is a partly enlarged view showing the optical path between the reflection mirrors 35a and 35b and the sensor 41 in FIG. 4. As shown in FIG. 5, the light from the reading regions Ra and Rb corresponding to the reflection mirrors 35a and 35b is imaged in the corresponding image regions 41a and 41b on the sensor 41. Here, even of the light traveling from outside the reading regions Ra and Rb, the rays of light (indicated by hatched regions in FIG. 5) inward of the principal ray are imaged on the sensor 41 by the reflection mirror 35a and 35b. Specially, the light reflected from the reflection mirror 35a strikes the neighboring image region 41b, and the light reflected from the reflection mirror 35b strikes the neighboring image region 41a. These imaging light, though very small in amount, form inverted images corresponding to different reading regions, and thus, if these imaging light overlap with the images which are supposed to be imaged in the image regions 41a and 41b, a defective image is produced.

Figure 6:
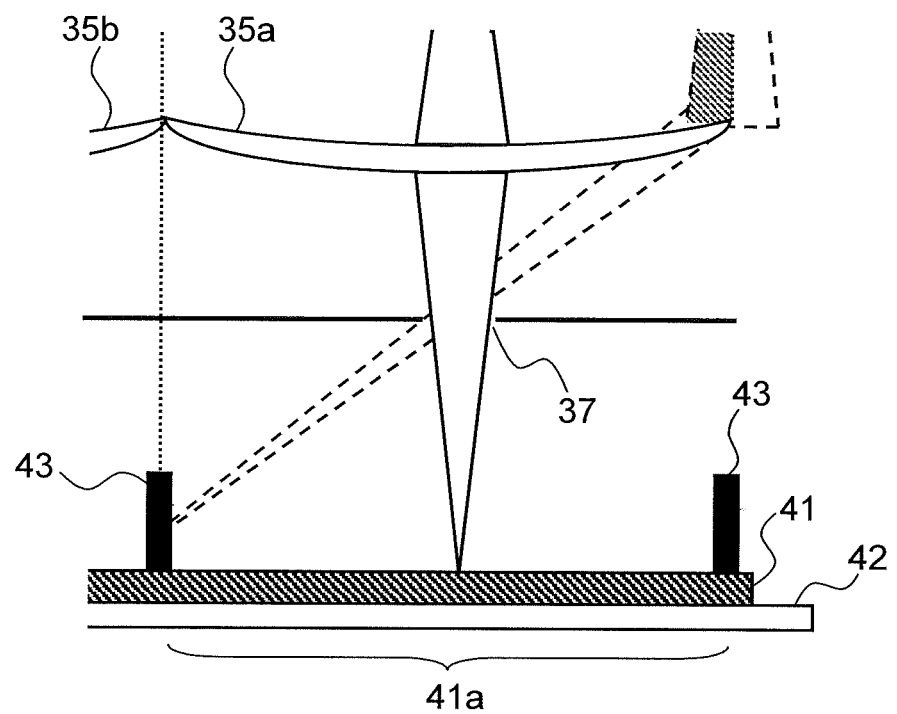

To avoid that, in this embodiment, the imaging magnification of the reflection mirrors 35a, 35b, 35c . . . of the mirror array 35 is set to be a reduction magnification, and as shown in FIG. 6, light shielding walls 43 are formed which protrude from the boundaries between the image regions 41a and 41b on the sensor 41 in the direction of the aperture stop portion 37.

Here, as shown in FIG. 6, for example, the image light d imaged in the image region 41a on the sensor 41 has the light from outside the reading region Ra shielded by the light shielding wall 43; it is thus possible to prevent stray light from striking the image region 41b arranged next to the image region 41a in the main scanning direction. Here, assuming that the imaging magnification of the reflection mirrors 35a, 35b, 35c . . . is set at a unity magnification, the whole area over the image regions 41a, 41b . . . up to the boundaries is used by the reflection mirrors 35a, 35b, 35c . . . to image the image light d. As a result, it is impossible to secure a space for forming the light shielding walls 43 at the boundaries between the image regions 41a, 41b . . . . To secure a space for forming the light shielding wall 43, as described above, it is necessary to set the imaging magnification of the reflection mirrors 35a, 35b, 35c . . . to be a reduction magnification.

The optical unit 40 including the mirror array 35 and the aperture stop portion 37 is preferably formed of resin by injection molding in terms of cost. Thus, considering expansion or contraction due to change in temperature around the reading module 50 (hereinafter, referred to as ambient temperature), it is necessary to determine a reduction magnification with a predetermined tolerance (margin). However, if the reduction magnification of the reflection mirrors 35a, 35b, 35c . . . is reduced, when a sensor 41 with a cell size (image region) corresponding to that magnification is used, a higher resolution on the sensor 41 is required, and even when a sensor 41 with a cell size for use in a unity magnification system is used, the resolution is low. Thus, it is preferable to maximize the reduction magnification.

On the other hand, the expansion and contraction of a resin material are dominated by the linear expansion coefficient, and are proportional to temperature change. Although the temperature of a place where the image forming apparatus 100 is installed is usually from 10° C. to 32.5° C., the inside of the image forming apparatus 100 is heated by radiant heat from the fixing portion 14, and thus the ambient temperature is expected to be approximately from 10° C. to 60° C. Thus, with a heavier weight placed on the higher side of normal temperature (25° C.), the arrangement of the light shielding wall 43 needs to be determined such that the desired rays of light are not shielded.

Figure 7:
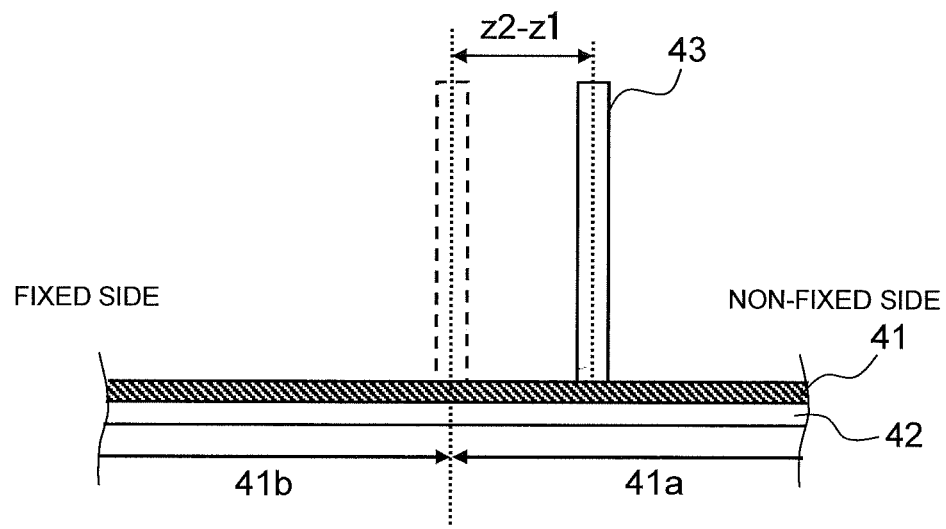
FIG. 7 is an explanatory diagram showing how the position of the light shielding wall 43 is determined with consideration given to the ambient temperature.

FIG. 7 is an explanatory diagram showing how the position of a light shielding wall 43 is determined with consideration given to the ambient temperature. With reference to FIG. 7, how the arrangement of the light shielding wall 43 (the position in the main scanning direction) is determined will be described.

It is assumed that the optical unit 40 comprising the mirror array 35 and the aperture stop portion 37 is formed of a resin material and is fixed on the housing 30 at one point in the main scanning direction. Assuming that the linear expansion coefficient of the resin material is 6 ($\times 10^{-5}$/k), and that the variation in temperature from the normal temperature (25° C.) is $\Delta t$ (° C.); then the amount of expansion z at a position a distance x (mm) from the fixed position is expressed by $$z = x \times \Delta t \times 6 \times 10^{-5} (mm) \quad (1)$$

Here, assuming that the fixed position of the optical unit 40 is at the center of the reading width (300 mm) of a document of A3 size, opposite end parts are located at x=150 mm. When the ambient temperature is 10° C., formula (1) gives z1=150×(10−25)×6×10$^{-5}$=−0.135 (mm); that is, contraction occurs from the normal temperature position toward the fixed side by 0.135 mm. When the ambient temperature is 60° C., formula (1) gives z2=150×(60−25)×6×10$^{-5}$=0.315 (mm); that is, expansion occurs from the normal temperature position toward the non-fixed side by 0.315 mm. Thus, as the optical unit 40 contracts or expands, the imaging position on the sensor 41 varies by the same distance.

That is, at the end part of the sensor 41, between 10° C. and 60° C. expected as the ambient temperature, the imaging portion varies more, namely by z2−z1=0.18 mm, on the higher temperature side. On the other hand, the light shielding wall 43 is formed, separately from the optical unit 40, of a material of which the linear expansion coefficient is smaller than the resin material forming the optical unit 40. Thus, even when the optical unit 40 expands or contracts due to change of the ambient temperature, the position of the light shielding wall 43 almost does not vary.

Thus, the light shielding wall 43 is not arranged at the boundary (the position indicated by a broken line in FIG. 7) between the image regions 41a and 41b but is arranged at a position (the position indicated by a solid line in FIG. 7) offset from the boundary between the image regions 41a and 41b to the non-fixed side by 0.18 mm. Here, how the position of the light shielding wall 43 arranged at the end part of the sensor 41 is determined has been described; it is also possible to determine the positions of the light shielding walls 43 arranged at other positions by calculating z1 and z2 based on the distance x from the fixed position.

With the above-described method, by determining the position of the light shielding wall 43 in the main scanning direction with consideration given to expansion and contraction of the optical unit 40 due to change in temperature, even when the imaging position on the sensor 41 moves as a result of expansion of the optical unit 40, the desired rays of light are not shielded by the light shielding wall 43. Thus, there is no need to reduce the reduction magnification of the reflection mirrors 35a, 35b and thus it is possible to perform high-resolution reading.

Figure 8:
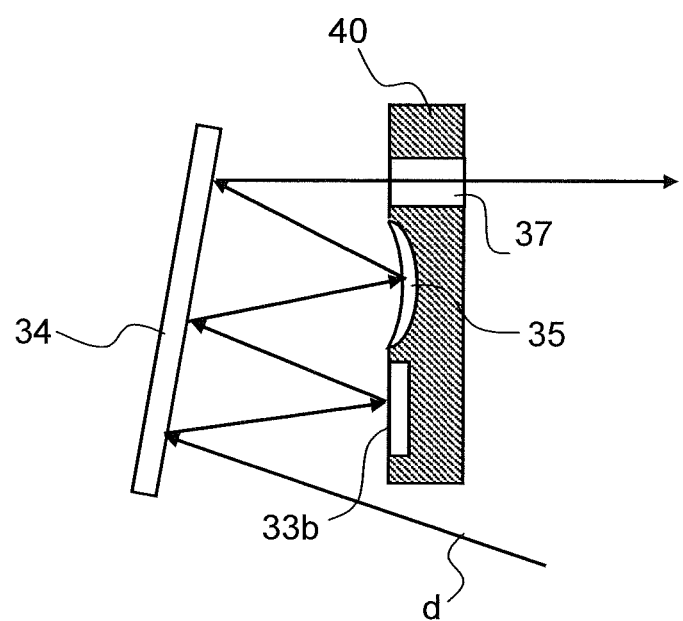
FIG. 8 is a partial sectional view showing a modified example of the reading module 50 according to this embodiment, showing the structure where a turning mirror 34 reflects an image light d three times.

The present invention may be implemented in any other manner than in the embodiments described above, and allows for many modification without departure from the spirit of the present invention. For example, the embodiment described above deals with a configuration where image light d traveling from the document 60 via the flat mirror 33a to strike the mirror array 35 and image light d reflected from the mirror array 35 to enter the aperture stop portion 37 are each reflected on the turning mirror 34 once, that is, twice in total; instead, as shown in FIG. 8, with a flat mirror 33a arranged on the optical unit 40 side, image light d may be reflected on the turning mirror 34 three times or more.

The embodiment described above deals with a configuration where the fixed position of the optical unit 40 is at the center in the main scanning direction (the document width direction); instead, the fixed position of the optical unit 40 may be at any point in the main scanning direction (the document width direction). For example, when the fixed position of the optical unit 40 is at one end in the main scanning direction, the light shielding walls 43 may be arranged at positions deviated by a predetermined amount from the boundaries between the image regions toward the other end (non-fixed side) in the main scanning direction. Also in this case, it is possible to determine the amount of deviation of the light shielding walls 43 by calculating z1 and z2 based on the distance x from the fixed position.

Although the above-described embodiments deal with, as an example of an image reading device, an image reading portion 6 incorporated in an image forming apparatus 100, the present invention is applicable equally to an image scanner used separately from an image forming apparatus 100.

The present invention is applicable to an image reading device provided with a reading module adopting a reading method that use reflection mirrors arranged in an array. Based on the present invention, it is possible to provide an image reading device that can, with a simple configuration, prevent stray light from striking a sensor in a case where sensor chips corresponding to the reduction magnification of the reflection mirrors are arranged next to each other on a base, and to provide an image forming apparatus incorporating such an image reading device.

The invention claimed is:

1. A reading module comprising:
light source which irradiates a document with light;
   an optical system which images, as image light, reflected light of the light with which the document is irradiated by the light source;
sensor in which a plurality of image regions where the image light imaged by the optical system is converted into an electrical signal are arranged next to each other in a main scanning direction; and
a housing which houses the light source, the optical system, and the sensor,
wherein
the optical system includes:
   a mirror array in which a plurality of reflection mirrors whose reflection surfaces are aspherical concave surfaces are coupled together in an array in the main scanning direction; and
   a plurality of aperture stop portions which are provided respectively between the reflection mirrors and the image regions of the sensor and which adjust an amount of image light reflected from the reflection mirrors,
the optical system is fixed on the housing at one point in the main in scanning direction,
an imaging magnification of the reflection mirrors with respective to the image regions is set at a reduction magnification,
a plurality of light shielding walls are provided which extend from the sensor toward the aperture stop portion, the light shielding walls being arranged at positions deviated by a predetermined amount from the boundaries between the image regions in a direction opposite to a fixed side of the optical system the light shielding walls shielding stray light striking the image regions,
an amount of deviation of the light shielding walls from the boundaries between the image regions are determined based on an amount of expansion and contraction of the optical system in the main scanning direction due to change in temperature, and
the light shielding walls are arranged at positions deviated from the boundaries between the image regions in the direction opposite to the fixed side of the optical system by a difference z2−z1 between an amount of contraction z1 of the optical system toward the fixed side and an amount of expansion z2 of the optical system toward a non-fixed side calculated by formula (1) below:

$$z = x \times \Delta t \times a \qquad (1)$$

where
x represents a distance from a fixed position of the optical system to a light shielding wall;

Δt represents a variation in ambient temperature from 25° C.; and a represents a linear expansion coefficient of a resin material forming the optical system.

2. The reading module according to claim 1, wherein the optical system is a telecentric optical system in which the image light is parallel to an optical axis on the document side of the mirror array and that images an inverted image on the sensor.

3. The reading module according to claim 1, wherein image data read in the image regions of the sensor is subjected to magnification enlargement correction though data interpolation according to the reduction magnification, the data is then inverted into an erect image, and the images in the respective image regions are connected together to form a read image corresponding to the document.

4. The reading module according to claim 1, wherein an optical path of the image light traveling toward the reflection mirrors and an optical path of the image light traveling toward the aperture stop portion run in a same direction, and a turning mirror that bends the image light reflected from the reflection mirrors toward the aperture stop portion is arranged at a position opposite the mirror array, and the turning mirror bends the image light twice or more times on a same reflection surface thereof, by bending at least the image light traveling toward the reflection mirrors and bending the image light reflected from the reflection mirrors toward the aperture stop portion.

5. The reading module according to claim 4, wherein the mirror array and the aperture stop portion are integrally formed.

6. An image reading device comprising:

a contact glass fixed to a top surface of an image reading portion;

a document conveying device which is openable and closable upward and downward with respect to the contact glass, the document conveying device conveying a document to an image reading position of the contact glass; and the reading module according to claim 1 arranged under the contact glass so as to be reciprocable in a sub-scanning direction, wherein the reading module is capable of reading an image of a document placed on the contact glass while moving in the sub-scanning direction, and the reading module is capable of reading an image of a document conveyed to the image reading position while remaining at rest at a position facing the image reading position.

7. An image forming apparatus comprising the image reading device according to claim 6.

8. A reading module comprising:

a light source which irradiates a document with light;

an optical system which images, as image light, reflected light of the light with which the document is irradiated by the light source;

a sensor in which a plurality of image regions where the image light imaged by the optical system is converted into an electrical signal are arranged next to each other in a main scanning direction; and a housing which houses the light source, the optical system, and the sensor, wherein the optical system includes:

a mirror array in which a plurality of reflection mirrors whose reflection surfaces are aspherical concave surfaces are coupled together in an array in the main scanning direction; and a plurality of aperture stop portions which are provided respectively between the reflection mirrors and the image regions of the sensor and which adjust the amount of image light reflected from the reflection mirrors, the optical system is fixed on the housing at one point in the main scanning direction, an imaging magnification of the reflection mirrors with respect to the image regions is set at a reduction magnification, a plurality of light shielding walls are provided which extend from the sensor toward the aperture stop portion and which shield stray light striking the image regions, the light shielding walls are arranged at positions deviated by a predetermined amount from the boundaries between the image regions in a direction opposite to a fixed side of the optical system, an optical path of the image light traveling toward the reflection mirrors and an optical path of the image light traveling toward the aperture stop portion run in a same direction, and a turning mirror that bends the image light reflected from the reflection mirrors toward the aperture stop portion is arranged at a position opposite the mirror array, a flat mirror that bends the image light reflected from the turning mirror back toward the turning mirror is arranged on a mirror array side, and the turning mirror bends the image light three times or more on a same reflection surface by at least bending the image light traveling toward the flat mirror, bending the image light reflected from the flat mirror and traveling toward the reflection mirrors, and bending the image light reflected from the reflection mirrors and traveling toward the aperture stop portion.

* * * * *